United States Patent
Fung

(10) Patent No.: US 11,368,295 B2
(45) Date of Patent: Jun. 21, 2022

(54) COMMUNICATION SYSTEM USING A RANDOM CODE AS AN ENCRYPTION CODE

(71) Applicant: Shing Kwong Fung, Tsuen Wan (CN)

(72) Inventor: Shing Kwong Fung, Tsuen Wan (CN)

( * ) Notice: Subject to any disclaimer, the term of this patent is extended or adjusted under 35 U.S.C. 154(b) by 207 days.

(21) Appl. No.: 16/516,278

(22) Filed: Jul. 19, 2019

(65) Prior Publication Data

US 2021/0021415 A1    Jan. 21, 2021

(51) Int. Cl.
| | | |
|---|---|---|
| *H04L 29/06* | (2006.01) | |
| *H04L 9/08* | (2006.01) | |
| *G06K 7/08* | (2006.01) | |
| *H04L 9/32* | (2006.01) | |

(52) U.S. Cl.
CPC ............ *H04L 9/0869* (2013.01); *G06K 7/087* (2013.01); *H04L 9/0819* (2013.01); *H04L 9/0877* (2013.01); *H04L 9/0894* (2013.01); *H04L 63/0428* (2013.01); *H04L 63/12* (2013.01); *H04L 9/32* (2013.01); *H04L 9/3234* (2013.01)

(58) Field of Classification Search
CPC ....... H04L 9/0869; H04L 9/0894; H04L 9/08; H04L 9/0819; H04L 9/0877; H04L 9/32; H04L 9/321; H04L 9/3234; H04L 63/04; H04L 63/0248; H04L 63/12; H04L 63/1408; H04L 63/0853; H04W 12/03
See application file for complete search history.

(56) References Cited

U.S. PATENT DOCUMENTS

| | | | |
|---|---|---|---|
| 2009/0214037 A1* | 8/2009 | Tuttle | H04L 9/0891 380/270 |
| 2013/0117815 A1* | 5/2013 | Goranov | H04L 63/08 726/3 |
| 2014/0341375 A1* | 11/2014 | Sugahara | H04L 9/0662 380/46 |
| 2015/0102899 A1* | 4/2015 | Kim | G07C 9/38 340/5.7 |
| 2020/0349786 A1* | 11/2020 | Ho | G06K 9/00288 |
| 2021/0058252 A1* | 2/2021 | Jung | H04L 9/14 |

* cited by examiner

*Primary Examiner* — Shaqueal D Wade-Wright

(57) ABSTRACT

A communication system using a random code as an encryption code is disclosed. A first terminal transfers a request to the second terminal for providing a random code (rKey). The random code is used to encrypt commands in the proceeding communication process instead of using a master key (mKey) so as to avoid that the master key (mKey) is captured. The safety in data transmission is promoted greatly. In practical use, the encryption way can be used to a door access system which includes a mobile phone, a card reader, a door access controller, and a server program (such as ACX server program). The communication system using a random code as an encryption code assures that the communications between these devices are highly safe.

5 Claims, 7 Drawing Sheets

COMMUNICATION SYSTEM USING A RANDOM CODE AS AN ENCRYPTION CODE

FIELD OF THE INVENTION

The present invention is related to encryption of communication process, and in particular to a communication system using a random code as an encryption code.

BACKGROUND OF THE INVENTION

With reference to FIG. 8, the prior art encryption system mainly includes a first terminal 10' which is used to transfer the input data to a far end for identification. In the transfer process, the data should be encoded, decoded, encrypted, and decrypted. The first terminal 10' is stored with a master key (mKey) 30'. A second terminal 20' is signally connected to the first terminal 10' for receiving data from the first terminal 10'. The second terminal 20 is stored with the master key (mKey) 30'. When the first terminal 10 desires to transfer a message (MES) 60'; The message (MES) 60' is encrypted with the master key (mKey) 30' to acquire an encrypted message (eMES) 62' which is then transferred to the second terminal 20'. When the second terminal 20 receives, the eMES is decrypted by using the master key (mKey) 30' so as to get the message (MES) 60'. Then the proceeding process is performed. Above mentioned encryption way is frequently used in the door access control.

However, in above mentioned prior art about using the master key (mKey) 30' to encrypt message, the master key (mKey) 30' is easily to be got illegally so that an intruder can intrude the door access system and thus the problem about door access safety occurs.

SUMMARY OF THE INVENTION

Accordingly, for improving above mentioned defects in the prior art, the object of the present invention is to provide a communication system using a random code as an encryption code, wherein In the present invention, the random code (rKey) 40 from the second terminal 20 is used to encrypt the command (CMD) 50 (or message (MES) 60) instead of the master key (mKey) 30. The object of this design is to avoid that the master key (mKey) 30 is captured. By the present invention, the safety in data transmission is promoted greatly. When the present invention is used to a door control system, the encryption is performed with a uncertain random code (rKey) which is also varied. Therefore, the problem of the door control occurred in the prior art that the master key is possible to be captured is resolved. In practical use, the encryption of the present invention can be used to a door access system which includes a mobile phone, a card reader, a door access controller, and a server program (such as ACX server program). The present invention may assure that the communications between these devices are highly safe.

To achieve above object, the present invention provides a communication system using a random code as an encryption code, comprising: a first terminal for transferring data to a far end terminal; the first terminal being stored with a master key (mKey); a second terminal signally connected to the first terminal for receiving the data from the first terminal; the second terminal being also stored with the master key (mKey); the second terminal including a random signal generator for generating a random (rKey); wherein the first terminal serves to transfer a command (CMD) for requesting a random code; before transferring, the command (CMD) is encrypted to become an encrypted command (eCMD) which is then transferred to the second terminal; when the second terminal receives the encrypted command (eCMD) from the first terminal, the encrypted command (eCMD) is decrypted by the same master key (mKey) to get the command (CMD); then the second terminal instructs the random signal generator to generate a random code (rKey); then the random code (rKey) is encrypted by the master key (mKey) to generate an encrypted random code (erKey) which is transferred back to the first terminal; next, the first terminal receives the encrypted random code (erKey) from the second terminal, the first terminal decrypts the encrypted random code (erKey) by using the master key (mKey) to acquire the random code (rKey); and when the first terminal desires to transfer a message, the message (MES) to be transferred is encrypted by using the random code (rKey) to have an encrypted message (eMES) which is then transferred to the second terminal; and then when the second terminal receives the encrypted message (eMES) from the first terminal, the encrypted message (eMES) is decrypted by using the random code (rKey) 40 to acquire the message (MES) 60.

The system can be used in a door access system.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 7, the first embodiment of the communication system of the present invention will be described herein.

A first terminal 10 serves to transfer data to a far end terminal for identification. The data is possible to be coded, decoded, encrypted or decrypted. The first terminal 10 is stored with a master key (mKey) 30.

Figure 1:
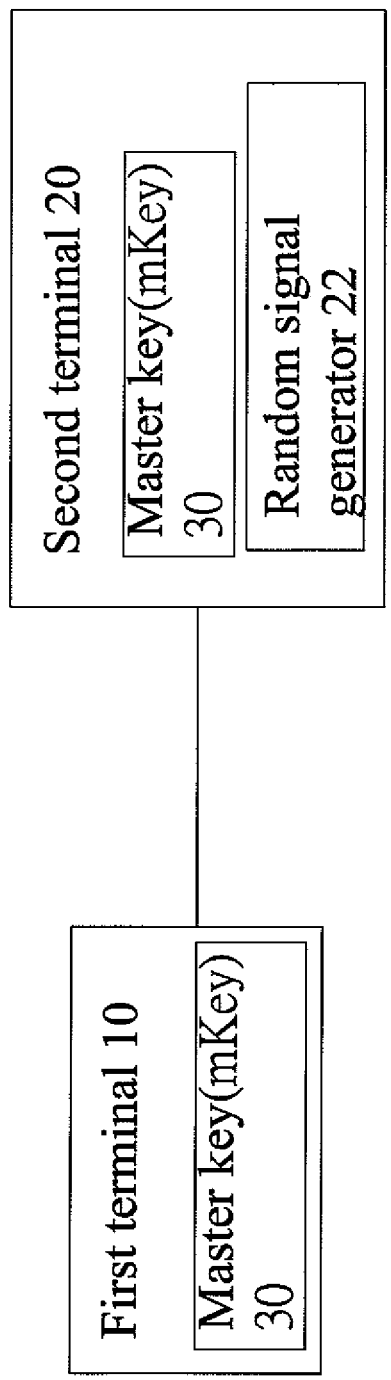
FIG. 1 is a structural schematic view about the element assembly of the present invention.

A second terminal 20 is signally connected to the first terminal 10 for receiving the data from the first terminal 10. As illustrated in FIG. 1, the second terminal 20 is also stored with the master key (mKey) 30. The second terminal 20 includes a random signal generator 22 for generating a random (rKey) 40.

The data transfer process between the first terminal 10 and the second terminal 20 is described herein.

Figure 2:
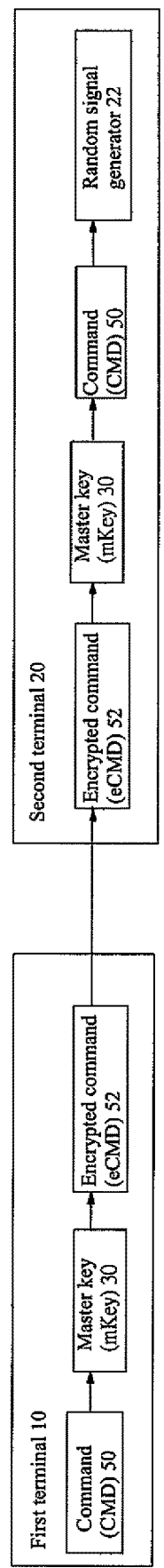
FIG. 2 is a schematic view about the operation of the command transfer of the first terminal.

With reference to FIG. 2, the first terminal 10 serves to transfer a command (CMD) 50 for requesting a random code. Before transferring, the command (CMD) 50 is encrypted to become an encrypted command (eCMD) 52 which is then transferred to the second terminal 20.

Figure 3:
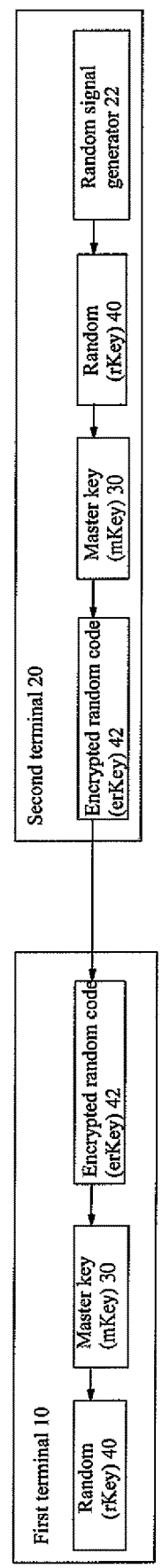
FIG. 3 is a schematic view about the operation of the random code generation of the present invention by the second terminal.

With reference to FIG. 3, when the second terminal 20 receives the encrypted command (eCMD) 52 from the first terminal 10, the encrypted command (eCMD) 52 is decrypted by the same master key (mKey) 30 to get the command (CMD) 50. Then the second terminal 20 instructs the random signal generator 22 to generate a random code (rKey) 40. Then the random code (rKey) 40 is encrypted by the master key (mKey) 30 to generate an encrypted random code (erKey) 42 which is transferred back to the first terminal 10.

When the first terminal 10 receives the encrypted random code (erKey) 42 from the second terminal 20, the first terminal 10 decrypts the encrypted random code (erKey) 42 by using the master key (mKey) 30 to acquire the random code (rKey) 40.

Figure 4:
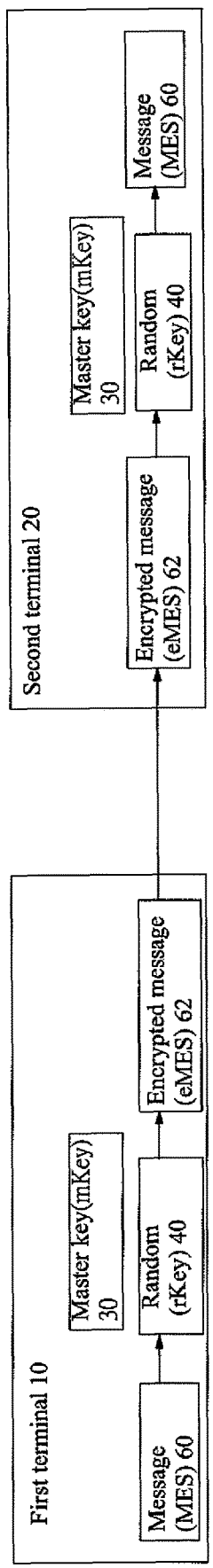
FIG. 4 is an operation schematic view showing that the message encryption and decryption by using the random code in the present invention.

With reference to FIG. 4, when the first terminal 10 desires to transfer a message, the message (MES) 60 to be transferred is encrypted by using the random code (rKey) 40 to have an encrypted message (eMES) 62 which is then transferred to the second terminal 20.

When the second terminal 20 receives the encrypted message (eMES) 62 from the first terminal 10, the encrypted message (eMES) 62 is decrypted by using the random code (rKey) 40 to acquire the message (MES) 60.

In the present invention, the message (MES) 60 to be transferred is encrypted by using the random code (rKey) 40 from the second terminal 20 instead of the master key (mKey) 30. The object is to avoid that the message (MES) 60 is captured illegally.

The first application of the present invention is that in all the communication process, only a random code (rKey) 40 is used. The random code (rKey) 40 in the communication process is unchanged.

The second application of the present invention is that the random code (rKey) 40 is changed each time a message (MES) 60 is transferred.

The third application of the present invention is that the random code (rKey) 40 is changed in a predetermined time period, that is, after the time period set is elapsed, the first terminal 10 requestss the second terminal 20 to transfer a new random code (rKey) 40.

Figure 5:
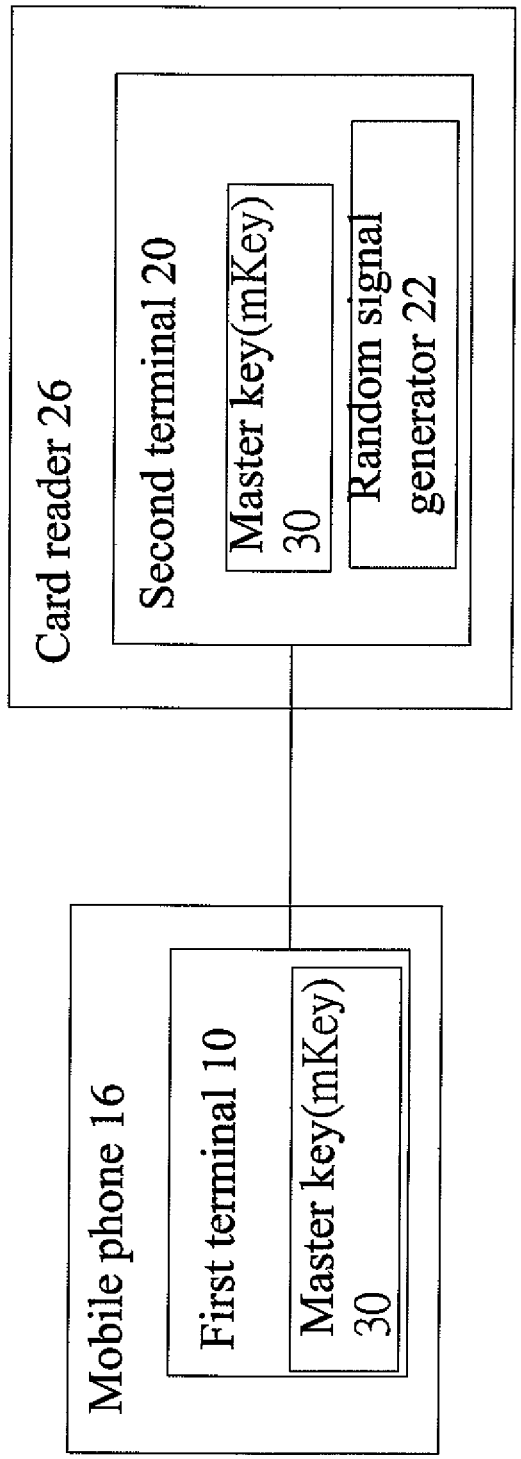
FIG. 5 is a structural assembly schematic view in the first embodiment of the present invention.

With reference to FIG. 5, the second embodiment of the present invention will be described herein. This present embodiment includes the following elements.

A mobile phone 16 includes the first terminal 10.

A card reader 26 includes the second terminal 20. The first terminal 10 and the second terminal 20 communicates by the way in the above embodiment. In this embodiment, the message (MES) 60 to be transferred from the first terminal 10 to the second terminal 20 is an identification data of a person.

Figure 6:
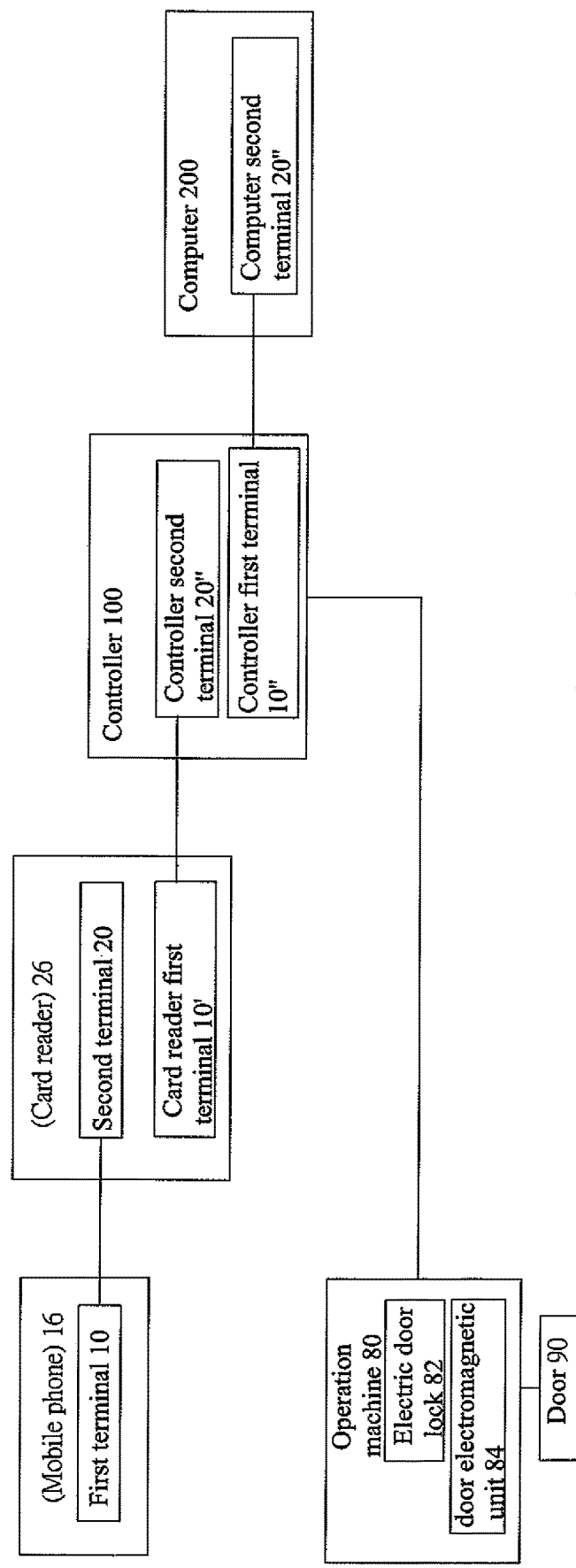
FIG. 6 is a structural assembly schematic view in the second embodiment of the present invention.

With reference to FIG. 6, the second embodiment of the present invention will be described herein. This present embodiment includes the following elements.

A mobile phone 16 includes the first terminal 10.

A card reader 26 includes the second terminal 20. The first terminal 10 and the second terminal 20 communicates by the way in the above embodiment. In this embodiment, the message (MES) 60 to be transferred from the first terminal 10 to the second terminal 20 is an identification data of a person.

Furthermore the card reader 26 further includes a card reader first terminal 10'.

A controller 100 includes a controller second terminal 20'. In communication, the card reader first terminal 10' is functioned as the first terminal 10, and the controller second terminal 20' is functioned as the second terminal 20. The card reader 26 reads the personal identification data from the mobile phone 16 and then the personal identification data is transferred from the card reader first terminal 10' to the controller second terminal 20' and thus to the controller 100.

An operation machine 80 is connected to the controller 100 for receiving instructions from the controller 100 and then performs instructed operations.

The controller 100 further includes a controller first terminal 10".

A computer 200 includes a computer second terminal 20". The communication between the controller first terminal 10" and the computer second terminal 20" is identical to the communication between the first terminal 10 and the second terminal 20. That is, the controller first terminal 10" is functioned as the first terminal 10 and the computer second terminal 20" is functioned as the second terminal 20. The controller 100 receives the personal identification data from the card reader 26 and then the personal identification data is transferred from the controller first terminal 10" to the computer second terminal 20". The computer 200 then determines whether the personal identification data is acceptable. Then a result after identified is transferred back to the controller 100.

According to the identified result, the controller 100 instructs the operation machine 80 to perform desired operations.

In FIG. 6, the operation machine 80 includes an electric door lock 82 and a door electromagnetic unit 84. The electric door lock 82 serves to open or close a door 90. The door electromagnetic unit 84 serves to detect whether the door 90 is opened or closed and transfers the detection result to the controller 100. The controller 100 will add the detection result from the door electromagnetic unit 84 to the personal identification data and then transfers to the computer 200 for further identification.

When the controller 100 receives a message from the computer 200 to show that the personal identification data is a permissible one, the controller 100 will instruct the electric door lock 82 to open the door 90, otherwise the controller 100 instruct the electric door lock 82 to close the door 90.

Figure 7:
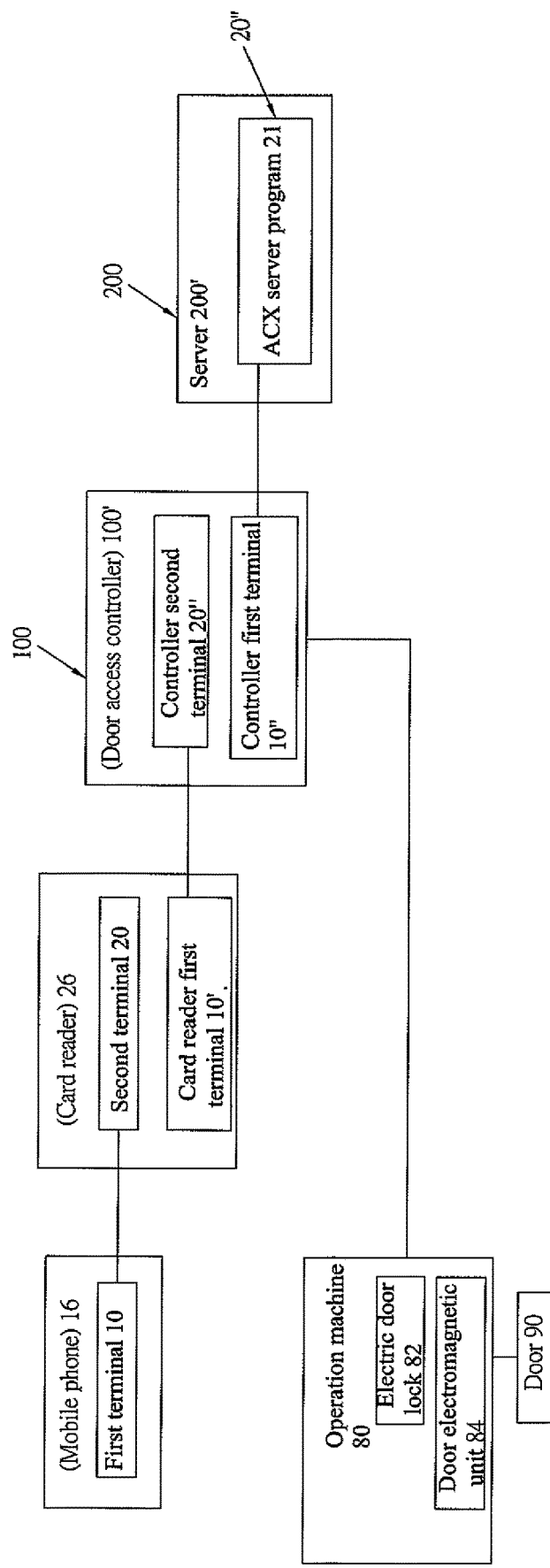
FIG. 7 is another structural assembly schematic view in the second embodiment of the present invention.
Figure 8:
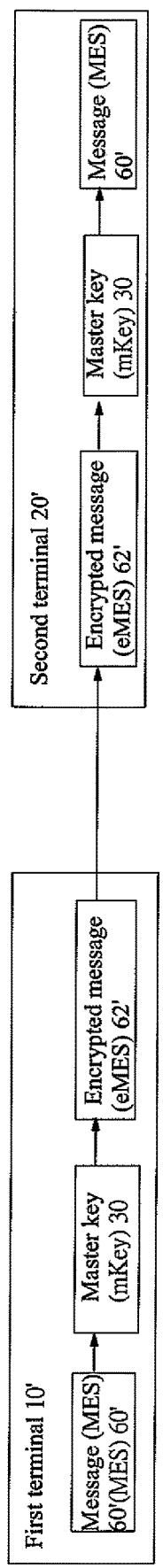
FIG. 8 is a structural assembly schematic view in the prior art.

FIG. 7 is a schematic view showing a practical usage of this embodiment. In that, the controller 100 is a door access controller 100'. The computer 200 is a server 200'. The computer second terminal 20" is a server program 21.

Advantages of the present invention will be described herein. In the present invention, the random code (rKey) 40 from the second terminal 20 is used to encrypt the command (CMD) 50 (or message (MES) 60) instead of the master key (mKey) 30. The object of this design is to avoid that the master key (mKey) 30 is captured. By the present invention, the safety in data transmission is promoted greatly. When the present invention is used to a door control system, the encryption is performed with a uncertain random code (rKey) which is also varied. Therefore, the problem of the door control occurred in the prior art that the master key is possible to be captured is resolved. In practical use, the encryption of the present invention can be used to a door access system which includes a mobile phone, a card reader, a door access controller, and a server program (such as ACX server program). The present invention may assure that the communications between these devices are highly safe.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A communication system using a random code as an encryption code, comprising:
    a first terminal for transferring data to a far end terminal; the first terminal being stored with a master key (mKey);
    a second terminal signally connected to the first terminal for receiving the data from the first terminal; the second terminal being stored with the master key (mKey); the second terminal including a random signal generator for generating a random (rKey);
    wherein the first terminal serves to transfer a command (CMD) for requesting a random code; before transferring, the command (CMD) is encrypted to become an encrypted command (eCMD) by using the master key (mKey) which is then transferred to the second terminal;
    when the second terminal receives the encrypted command (eCMD) from the first terminal, the encrypted command (eCMD) is decrypted by the same master key (mKey) to get the command (CMD); then the second terminal instructs the random signal generator to generate a random code (rKey); then the random code (rKey) is encrypted by the master key (mKey) to generate an encrypted random code (erKey) which is transferred back to the first terminal;
    next, the first terminal receives the encrypted random code (erKey) from the second terminal, the first terminal decrypts the encrypted random code (erKey) by using the master key (mKey) to acquire the random code (rKey); and
    when the first terminal desires to transfer a message, the message (MES) to be transferred is encrypted by using the random code (rKey) to have an encrypted message (eMES) which is then transferred to the second terminal; and
    then when the second terminal receives the encrypted message (eMES) from the first terminal, the encrypted message (eMES) is decrypted by using the random code (rKey) to acquire the message (MES); and
    a mobile phone including the first terminal;
    a card reader including the second terminal; the message to be transferred from the first terminal to the second terminal is an identification data of a person;
    the card reader further including a card reader first terminal;
    a controller including a controller second terminal; in communication, the card reader first terminal performs is functioned identical to the first terminal, and the controller second terminal is functioned identical to the second terminal;
    wherein the card reader reads personal identification data from the mobile phone and then the personal identification data is transferred from the card reader first terminal to the controller second terminal and thus to the controller;
    an operation machine connected to the controller for receiving instructions from the controller and then performs instructed operations defined by the instructions;
    the controller further including a controller first terminal;
    a computer including a computer second terminal; the communication between the controller first terminal and the computer second terminal being identical to the communication between the first terminal and the second terminal; that is, the controller first terminal is functioned identical to the first terminal and the computer second terminal is functioned identical to the second terminal; the controller receives the personal identification data from the card reader and then the personal identification data is transferred from the controller first terminal to the computer second terminal; the computer then determines whether the personal identification data is acceptable; then a result after identification is transferred back to the controller; and
    wherein according to the identified result, the controller instructs the operation machine to perform desired operations; and
    wherein the operation machine includes an electric door lock and a door electromagnetic unit; the electric door lock serves to open or close a door; the door electromagnetic unit serves to detect whether the door is opened or closed and transfers the detection result to the controller; the controller will add the detection result from the door electromagnetic unit to the personal identification data and then transfers to the computer for further identification; and
    when the controller receives a message from the computer to show that the personal identification data is a permissible one, the controller will instruct the electric door lock to open the door, otherwise the controller instruct the electric door lock to close the door.

2. The communication system using a random code as an encryption code as claimed in claim 1, wherein in all the communication processes, only a random code (rKey) is used.

3. The communication system using a random code as an encryption code as claimed in claim 1, wherein the random code (rKey) is changed each time a message (MES) is transferred.

4. The communication system using a random code as an encryption code as claimed in claim 1, wherein the random code (rKey) is changed in a predetermined time period.

5. The communication system using a random code as an encryption code as claimed in claim 1, wherein the controller is a door access controller; the computer is a server; the computer second terminal is a server program.

* * * * *